United States Patent
Mao et al.

(10) Patent No.: US 10,466,470 B2
(45) Date of Patent: Nov. 5, 2019

(54) CONFIGURABLE OPTICAL TRANSDUCERS USING AN OPTICAL MODULATOR AND ONE OR MORE LENSES

(71) Applicant: ABL IP HOLDING LLC, Conyers, GA (US)

(72) Inventors: An Mao, Reston, VA (US); David P. Ramer, Reston, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 241 days.

(21) Appl. No.: 15/228,414

(22) Filed: Aug. 4, 2016

(65) Prior Publication Data
US 2018/0039070 A1 Feb. 8, 2018

(51) Int. Cl.
| | |
|---|---|
| H01J 40/14 | (2006.01) |
| G02B 26/00 | (2006.01) |
| G02B 3/00 | (2006.01) |
| F21V 14/00 | (2018.01) |
| G01J 1/04 | (2006.01) |
| F21V 5/04 | (2006.01) |
| F21V 5/00 | (2018.01) |
| G01J 1/26 | (2006.01) |
| G01J 1/44 | (2006.01) |
| F21Y 115/10 | (2016.01) |
| F21Y 113/10 | (2016.01) |

(52) U.S. Cl.
CPC .......... *G02B 26/005* (2013.01); *F21V 5/007* (2013.01); *F21V 5/008* (2013.01); *F21V 5/04* (2013.01); *F21V 14/003* (2013.01); *G01J 1/0411* (2013.01); *G01J 1/26* (2013.01); *G02B 3/0056* (2013.01); *F21Y 2113/10* (2016.08); *F21Y 2115/10* (2016.08); *G01J 2001/446* (2013.01)

(58) Field of Classification Search
CPC ......... G02B 26/005; F21V 5/007; F21V 5/04; F21V 14/003
USPC ................................................. 250/206, 216
See application file for complete search history.

(56) References Cited

U.S. PATENT DOCUMENTS

| | | |
|---|---|---|
| 8,773,766 B2 | 7/2014 | Jannard et al. |
| 2007/0097515 A1 | 5/2007 | Jung et al. |

(Continued)

OTHER PUBLICATIONS

Non Final Office Action for U.S. Appl. No. 15/228,371, dated Oct. 4, 2018, 23 pages.

(Continued)

*Primary Examiner* — Kevin K Pyo
(74) *Attorney, Agent, or Firm* — RatnerPrestia

(57) ABSTRACT

A configurable optical device may include an optical transducer, a multi-lens arrangement, and a controllable optical modulator. The optical transducer is configured to convert light to electrical signals or to convert electrical signals to light. The multi-lens arrangement is positioned to redirect at least some of the light to or from the optical transducer. The controllable optical modulator is provided between the multi-lens arrangement and the optical transducer. The controllable optical modulator is coupled to receive and spatially modulate light to or from the optical transducer. The optical modulator is selectively controllable to steer and/or shape the light to a selected distribution of light from the multi-lens arrangement onto the optical transducer and/or from the optical transducer onto the multi-lens arrangement.

27 Claims, 14 Drawing Sheets

(56) References Cited

U.S. PATENT DOCUMENTS

| | | | |
|---|---|---|---|
| 2010/0230611 A1* | 9/2010 | Fukuyama | B82Y 15/00 250/459.1 |
| 2010/0296148 A1 | 11/2010 | Reichelt et al. | |
| 2011/0085244 A1 | 4/2011 | Jannard et al. | |
| 2015/0153020 A1* | 6/2015 | Akiyama | G03B 21/2073 353/20 |
| 2016/0054483 A1 | 2/2016 | Feng et al. | |

OTHER PUBLICATIONS

Final Office Action for U.S. Appl. No. 15/228,371, dated Apr. 1, 2019—13 pages.
Non Final Office Action for U.S. Appl. No. 15/228,371, dated Aug. 22, 2019, 13 pages.

* cited by examiner

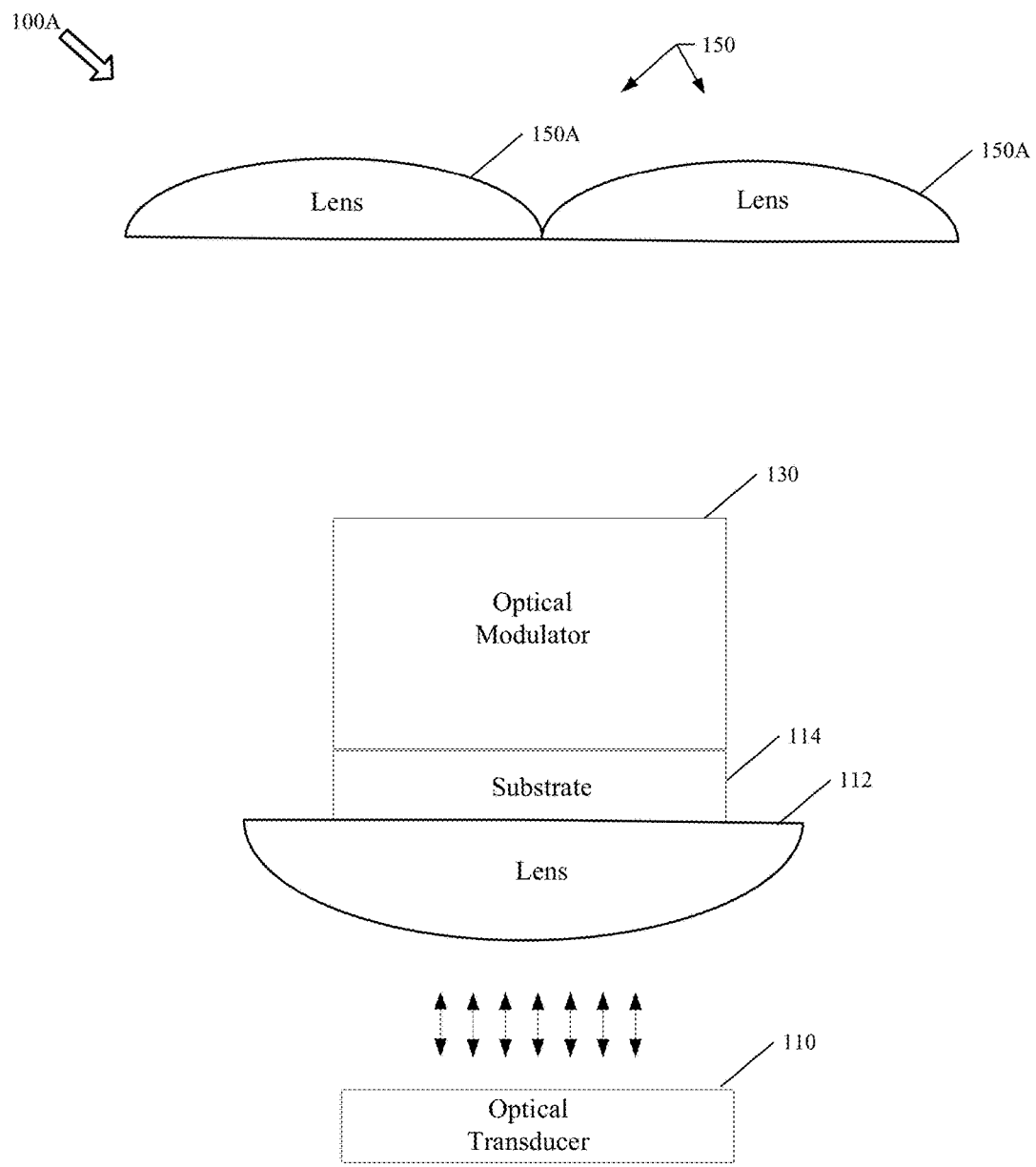

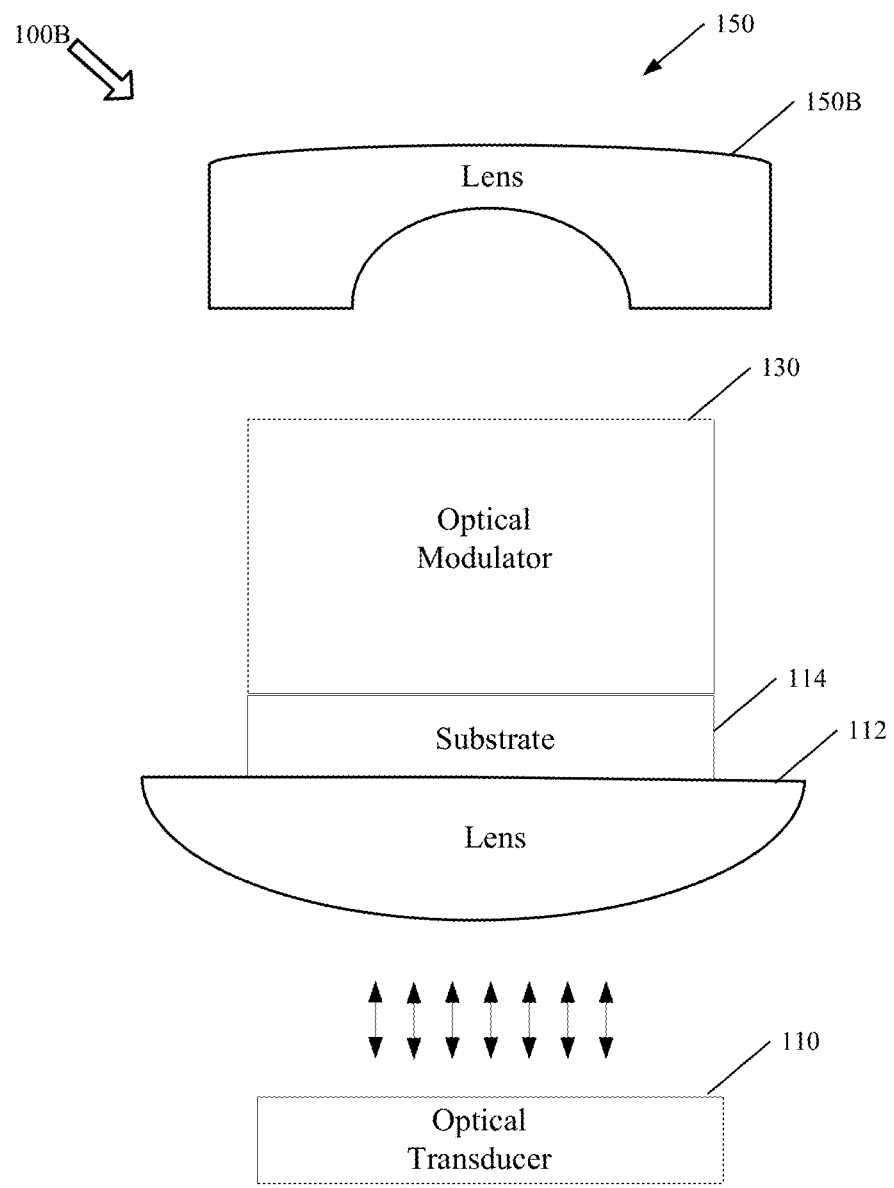

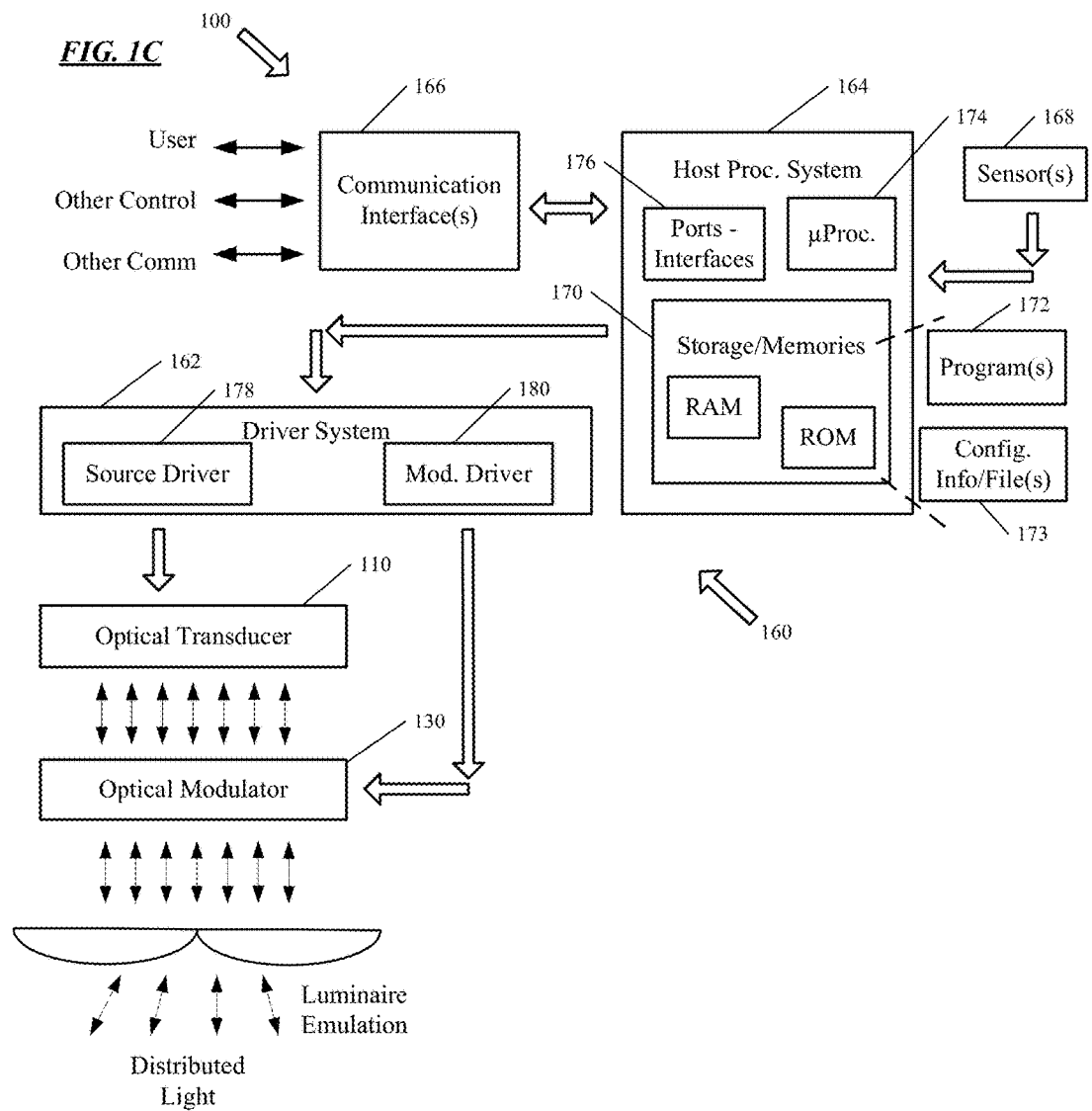

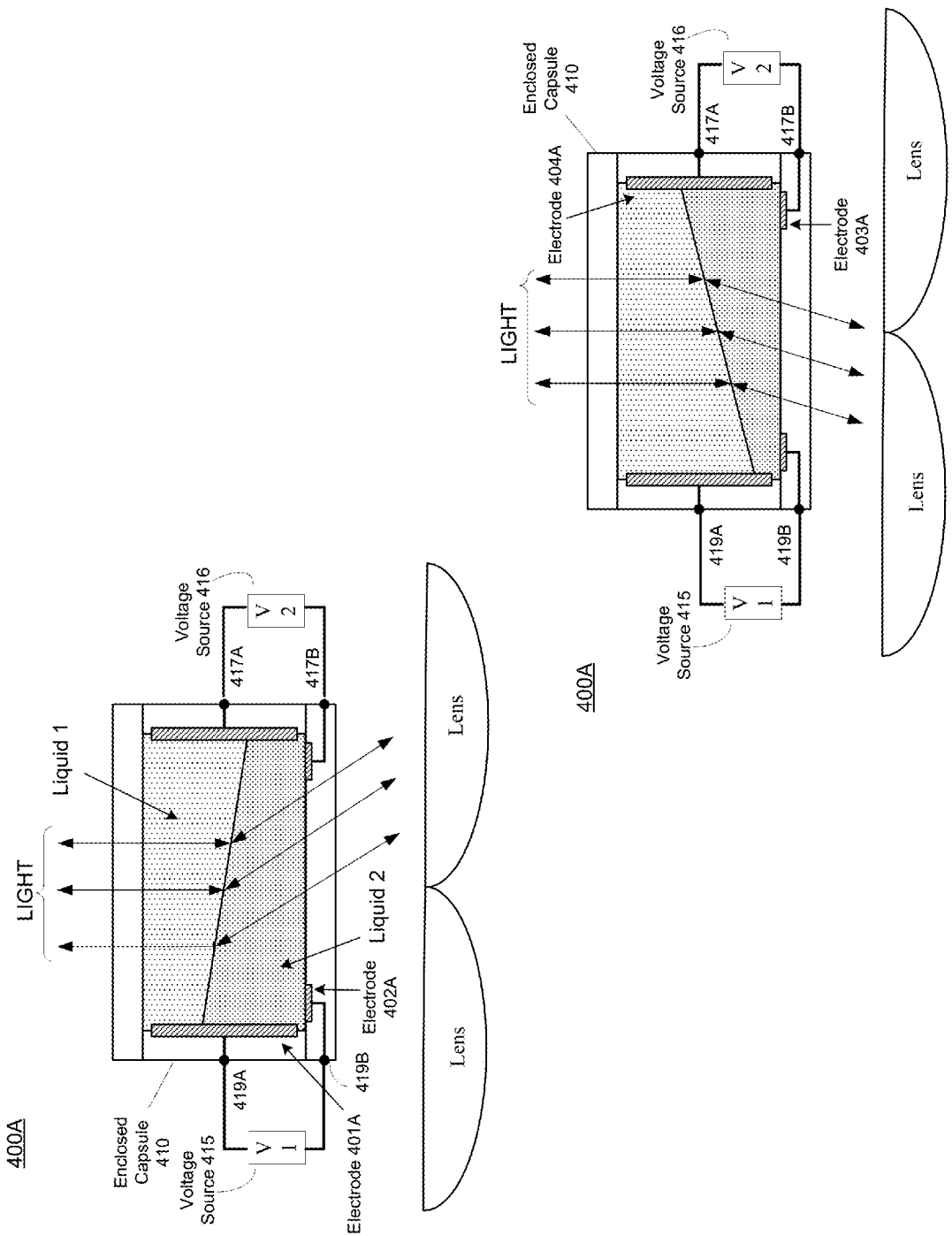

CONFIGURABLE OPTICAL TRANSDUCERS USING AN OPTICAL MODULATOR AND ONE OR MORE LENSES

TECHNICAL FIELD

The disclosed subject matter relates to optical transducers, and to configurations and/or operations thereof, whereby a device having a light source or a light detector, an optical modulator and one or more lenses is configurable by software for a programmable controller, e.g. to respectively generate or receive a selected lighting distribution.

BACKGROUND

Optical transducers include various categories of devices that are configured to convert light into electrical signals, and/or that convert electrical signals to light. Hence, one type of optical transducers are electrically powered lighting devices or luminaires. Electrically powered artificial lighting has become ubiquitous in modern society. Electrical lighting devices are commonly deployed, for example, in homes, buildings of commercial and other enterprise establishments, as well as in various outdoor settings.

In conventional lighting devices, the luminance output can be turned ON/OFF and often can be adjusted up or dimmed down. In some devices, e.g. using multiple colors of light emitting diode (LED) type sources, the user may be able to adjust a combined color output of the resulting illumination. The changes in intensity or color characteristics of the illumination may be responsive to manual user inputs or responsive to various sensed conditions in or about the illuminated space. The optical distribution of the light output, however, typically is fixed. Various different types of optical elements are used in such lighting devices to provide different light output distributions, but each type of device has a specific type of optic designed to create a particular light distribution for the intended application of the lighting device. The dimming and/or color control features do not affect the distribution pattern of the light emitted from the luminaire.

To the extent that multiple distribution patterns are needed for different lighting applications, multiple luminaires must be provided. To meet the demand for different appearances and/or different performance (including different distributions), a single manufacturer of lighting devices may build and sell thousands of different luminaires.

Some special purpose light fixtures, for example, fixtures designed for stage or studio type lighting, have implemented mechanical adjustments. Mechanically adjustable lenses and irises enable selectable adjustment of the output light beam shape, and mechanically adjustable gimbal fixture mounts or the like enable selectable adjustment of the angle of the fixture and thus the direction of the light output. The adjustments provided by these mechanical approaches are implemented at the overall fixture output. Such adjustments provide relatively coarse overall control and are really optimized for special purpose applications, not general lighting.

There have been more recent proposals to develop lighting devices offering electronically adjustable light beam distributions, using a number of separately selectable/controllable solid state lamps or light engines within one light fixture. In at least some cases, each internal light engine or lamp may have an associated adjustable electro-optic component to adjust the respective light beam output, thereby providing distribution control for the overall illumination output of the fixture.

Adjustment of light distribution for transducer is not limited to outputs from lighting devices. The growing prevalence of light detectors (such as used in occupancy sensors, ambient light sensors, image sensors, etc.) in electronics engenders a corresponding need to control the distribution of incoming light onto those light detectors. By reconfiguring the distribution of light onto a light detector, the image or other light information acquired by any particular light detector may be selected or adjusted to suit a particular application or need.

Although the more recent proposals provide a greater degree of distribution adjustment and may be more suitable for general lighting applications and/or sensor applications, there may be room for still further improvement in the degree of lighting distribution adjustment provided in optical transducers.

SUMMARY

The concepts disclosed herein improve over the art by providing software configurable optical transducers with one or more lenses cascaded with an optical modulator, such as an electrowetting optic.

The detailed description below and the accompanying drawings disclose examples of a configurable optical device. In such an example, the optical device may include an optical transducer, a multi-lens arrangement, and a controllable optical modulator. The optical transducer is configured to convert light to electrical signals or to convert electrical signals to light. The multi-lens arrangement is positioned to redirect at least some of the light to or from the optical transducer. The controllable optical modulator is provided between the multi-lens arrangement and the optical transducer. The controllable optical modulator is coupled to receive and spatially modulate light to or from the optical transducer. The optical modulator is selectively controllable to steer and/or shape the light to a selected distribution of light from the multi-lens arrangement onto the optical transducer and/or from the optical transducer onto the multi-lens arrangement.

The multi-lens arrangement may be a pair of lenses positioned side-by-side, or may be an N×M array of lenses in side-by-side contact with one another, wherein N and M are integers greater than or equal to 2. The contact between the lenses may intersect or fall on an optical axis of the controllable optical modulator. In some examples, the multi-lens arrangement may be a 2×2 array of lenses. The multi-lens arrangement may alternatively in some examples be replaced with a single spherical or aspherical fisheye lens.

The optical transducer may comprise one or more light sources, which may be combined together in one relatively integral unit, e.g. in a luminaire. Likewise, the optical transducer may comprise one or more light detectors, which may be combined together into an integral unit, e.g. in an image sensor. Alternatively, multiple optical transducers may be provided somewhat separate from each other, e.g. with the controller and possibly a memory separate from the optical transducer and the controllable optical modulator.

In a number of examples, an artificial lighting luminaire includes a light source configured to provide artificially generated light for a general lighting application and a controllable electrowetting optic coupled to selectively, optically process the light output from the light source. In other examples, an optical sensor includes a detector, such as a visible, infrared, ultraviolet light detector, a photovoltaic device, or a visible light or other light spectrum sensitive imager.

The examples discussed below also encompass methods of operation or control of configurable optical devices, methods of installation of configuration information in such equipment, as well as programming and/or configuration information files for such equipment, e.g. as may be embodied in a machine readable medium. In these examples, a controller may be provided for controlling the optical modulator and/or the optical transducer.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIGS. 1A and 1B are high-level block diagrams of examples of configurable optical devices, systems or apparatuses.

FIG. 1C is a high-level functional block diagram of a configurable optical device, system or apparatus.

FIGS. 5A and 5B are cross-sectional diagrams of electrowetting optical modulators of a configurable optical device, system, or apparatus.

DETAILED DESCRIPTION

Figure 2:
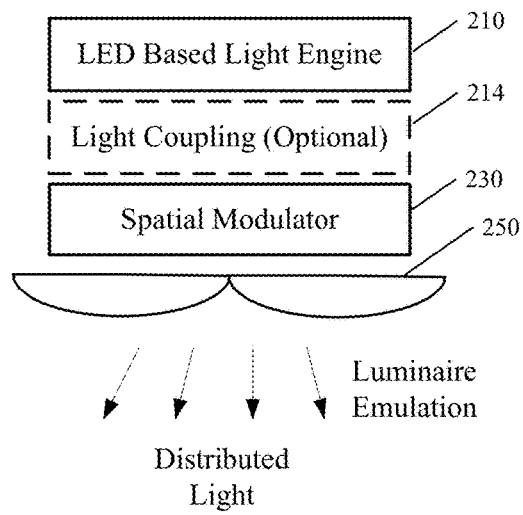
FIG. 2 is a high-level functional block diagram of an example of the light source and spatial modulator of a configurable lighting device.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The examples discussed below and shown in the drawings improve over the art by providing configurable optical/ electrical devices. Such devices include optical/electrical transducers. One class of such transducers, for example, converts detected optical energy to electrical energy. Another class of such transducers, for example, converts electrical energy or power to optical output energy, e.g. into light output.

The examples below primarily are described with respect to optical transducers that are light sources for illuminating an area with artificial lighting. However, it will be understood that the optical transducers described herein are not limited to light sources. To the contrary, the disclosed optical transducers may include light detectors, such as photodiodes or photovoltaic devices. Accordingly, the optical devices described herein are not intended to be limited to any particular form of optical transducer.

Human habitation often requires augmentation of natural ambient lighting with artificial lighting. For example, many office spaces, commercial spaces and/or manufacturing spaces require task lighting even when substantial amounts of natural ambient lighting are available. The configurable lighting techniques under consideration here may be applied to any indoor or outdoor region or space that requires at least some artificial lighting. The lighting equipment involved here provides the main artificial illumination component in the space, rather than ancillary light output as might be provided by a display, or by or in association with a sound system, or the like. As such, the illumination from the fixtures, lamps, luminaires or other types of lighting devices is the main artificial illumination that supports the purpose of the space, for example, the lighting that alone or in combination with natural lighting provides light sufficient to allow occupants in the space to perform the normally expected task or tasks associated with the planned usage of the space. Often, such lighting is referred to as "general" lighting or "general" illumination.

Various examples disclosed herein relate to a lighting device that is configurable to enhance steering of light by changing the distribution of light using one or more lenses cascaded with a controllable optical modulator. This enhanced steering may be used to emulate a lighting distribution of a selected one of a variety of different lighting devices, and/or to select a lighting distribution on a light detector. In the examples, such a device includes an optical transducer, a controllable optical modulator, and one or more lenses. The modulator spatially modulates light to or from the light source to create a selected distribution of light, e.g., to emulate a lighting distribution of a selected one of a number of types of luminaire for a general illumination application.

The term "lighting device" as used herein is intended to encompass essentially any type of device that processes power to generate light, for example, for illumination of a space intended for use of or occupancy or observation, typically by a living organism that can take advantage of or be affected in some desired manner by the light emitted from the device. However, a lighting device may provide light for use by automated equipment, such as sensors/monitors, robots, etc. that may occupy or observe the illuminated space, instead of or in addition to light provided for an organism. A lighting device, for example, may take the form of a lamp, light fixture or other luminaire that incorporates a source, where the source by itself contains no intelligence or communication capability (e.g. LEDs or the like, or lamp ("regular light bulbs") of any suitable type) and the associated spatial modulator. Alternatively, a fixture or luminaire may be relatively dumb but include a source device (e.g. a "light bulb") that incorporates the intelligence and spatial modulation capabilities discussed herein. In most examples, the lighting device(s) illuminate a service area to a level useful for a human in or passing through the space, e.g. regular illumination of a room or corridor in a building or of an outdoor space such as a street, sidewalk, parking lot or performance venue. However, it is also possible that one or more lighting devices in or on a particular premises served by a system of lighting devices have other lighting purposes, such as signage for an entrance or to indicate an exit. Of course, the lighting devices may be configured for still other purposes, e.g. to benefit human or non-human organisms or to repel or even impair certain organisms or individuals. The actual source in each lighting device may be any type of artificial light emitting unit.

The lighting devices discussed by way of examples below generally provide configurable artificial lighting, typically in support of any one of a number of possible general lighting applications for a luminaire of the like. Hence, a number of the examples below include one or more non-imaging type light sources that do not generate a visible image representation of information as might otherwise be perceptible to a person observing the generated light. The modulated light output in the examples will provide a selected illumination light distribution, for a general lighting application.

A "sensor" type device includes a light detector. Much like luminaires, sensors find a wide variety of applications in modern electronics, for example, to generate power from light, sense a light characteristic (e.g. intensity or a color characteristic), a light characteristic that represents another condition (e.g. infrared light as an indication of whether or not an area is occupied), pixels of light representing an image, etc. The term "light sensor" as used herein is intended to encompass essentially any type of device that processes light to generate an electrical signal suitable for further processing, for example, for acquiring an image of a space or for generating power from the processed light. A simple light sensor for many applications includes a photo-detector, such as a photodiode or the like, that generates a signal based on or responsive to received light. Circuitry of the sensor processes the signal(s) from the photo-detector to a form usable by other electronics, e.g. to a pulse train format, a digitized data format, etc. A light sensor, for example, may take the form an image sensor or "imager." In the imager example, light-responsive data produced from output signals of a pixel array of detectors is processed by one or more data processors coupled to the light sensor, e.g. to store data relating to the type and quantity of light received by the light detector, such as a digitized data representation of an image or video in a particular standardized data format. Alternatively, the light detector may be a photovoltaic device designed to convert the light received by the light detector into electrical power for one or more applications. In most examples, the light detector(s) receive light from a certain light source (either solar light or artificial light reflected from a scene under observation). The actual light received by the light detectors may have any source.

The term "coupled" as used herein refers to any logical, physical, optical or electrical connection, link or the like by which forces, energy, signals or other actions produced by one system element are imparted to another "coupled" element. Unless described otherwise, coupled elements or devices are not necessarily directly connected to one another and may be separated by intermediate components, elements or communication media that may modify, manipulate or carry the signals. The "coupled" term applies both to optical coupling and to electrical coupling. For example, the controllable optical modulator is coupled by any of various available optical techniques to receive and modulate light from or to an optical transducer, whereas a processor or the like may be coupled to control and/or exchange instructions or data with other elements of a device or system via electrical connections, optical connections, electromagnetic communications, etc.

Reference now is made in detail to the examples illustrated in the accompanying drawings and discussed below. FIGS. 1A and 1B are high-level functional block diagrams of various optical devices 100A, 100B. As a general overview, an optical device 100 may include an optical transducer 110, an optical modulator 130 for modulating the light to or from optical transducer 110, and one or more lenses 150. Additional details regarding optical device 100 are set forth below.

Optical transducer 110 is configured to covert light to electrical signals, or convert electrical signals to light. In one example, optical transducer 110 is an electrical-to-optical converter, that is to say, a light source configured to emit light. The light source may typically be a non-imaging type of light source, e.g. not an imaging source that might provide display or other similar image-based output functionalities. Nonetheless, virtually any source of artificial light may be used as the transducer 110. A variety of suitable light generation sources are indicated below.

Suitable light generation sources for use as optical transducer 110 include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used to implement the transducer 110.

When optical transducer 110 is a light source, the light source may use a single emitter to generate light, may combine light from some number of emitters that generate the light. A lamp or 'light bulb' is an example of a single source; an LED light engine may provide a single output for a single source but typically combines light from multiple LED type emitters within the single engine. Many types of light sources provide an illumination light output that generally appears uniform to an observer, although there may be some color or intensity striations, e.g. along an edge of a combined light output. For purposes of the present examples, however, the appearance of the light source output may not be strictly uniform across the output area or aperture of the source. For example, although the source may use individual emitters or groups of individual emitters to produce the light generated by the overall source; depending on the arrangement of the emitters and any associated mixer or diffuser, the light output may be relatively uniform across the aperture or may appear pixelated to an observer viewing the output aperture. The individual emitters or groups of emitters may be separately controllable, for example to control intensity or color characteristics of the source output. As such, the non-imaging source may or may not be pixelated for control purposes. Even if pixelated for appearance and control purposes, the emitter arrangement and the attendant control need not produce a perceptible image like a display in the output of the source and/or via the distributed output of the optical device 100. In some non-display example, the pixelated output of the source and/or of the optical device 100 for luminaire distribution emulation may provide a visible light pattern, such as a static or variable color mosaic.

In another example, optical transducer 110 is an optical-to-electrical converter, that is to say, a light detector. The overall device may be configured as an imager, other light responsive sensor, light responsive power source, or the like. The light detector may be an array of light detectors, a photo-detector such as a photodiode, or a photovoltaic device, depending on the desired function of optical device 100. Other suitable light detectors for use as optical transducer 110 include charge-coupled device (CCD) arrays, complementary metal-oxide-semiconductor (CMOS) arrays, photomultipliers, image intensifiers, phototransistors, photo resistors, thermal imagers, and micro-electromechanical systems (MEMS) imagers. Nonetheless, virtually any detector of light may be used as the transducer 110. Suitable light detectors will be known to one of ordinary skill in the art from the description herein.

While light source examples and light detector examples are described separately, it will be understood that both types of optical transducers 110 may be present in a single optical device 100 and/or some optical transducers can serve both input and output functions (e.g. some LED can be multiplexed between the emitting operation and a light detection operation). Such a combined arrangement or operation, for example, may advantageously provide capabilities to reconfigure the light output distribution in accordance with a desired light detection pattern.

Optical transducer 110 may output light to or receive light from a lens 112, as shown in FIGS. 1A and 1B. Lens 112 is coupled to redirect light from optical transducer 110 toward optical modulator 130, or redirect light from optical modulator 130 to optical transducer 110. In the example shown in FIGS. 1A and 1B, lens 112 is a positive lens, i.e., a lens that focuses or converges light passing therethrough. The extent to which lens 112 focuses the light passing therethrough is dependent on the focal length of lens 112. It will be understood that other structures may be used for redirecting light toward or from optical modulator 130, for example by reflection, refraction, or diffraction. For another example, lens 112 may be a total internal reflection (TIR) lens which receives and redirects light in order to focus the light from a light source onto a particular region of optical modulator 130, or to focus light from optical modulator 130 onto a particular region of a light detector.

In addition to lens 112, a substrate 114 may be provided between lens 112 and optical modulator 130. As shown in FIGS. 1A and 1B, substrate 114 fills the space between lens 112 and optical modulator 130. Substrate 114 may be provided, for example, to promote coupling of light between lens 112 and optical modulator 130, and/or prevent unintended reflection of light by the surface of lens 112 or optical modulator 130. As such, substrate 114 may be formed from the same or similar material as optical modulator 130, such as glass, for example. Other suitable materials include transparent plastic material such as acrylic materials or polycarbonate materials. Additionally, an anti-reflective coating may be applied to substrate 114 if there is a distance between lens 112 and optical modulator 130 in order to reduce reflective loss.

Optical modulator 130 is configured to spatially modulate light. Optical modulator 130 may be configured to steer and/or shape light onto optical transducer 110 (for light detectors), and/or may be configured to steer and/or shape light from optical transducer 110 (for light sources). A variety of suitable modulators, and several examples of spatial modulation techniques, are described in detail below. The type of modulator 130 chosen for use with the particular optical transducer 110 enables the modulator 130 to optically, spatially modulate the light to or from transducer 110.

Examples of controllable optical modulators that may be used as modulator 130 include electrowetting based dynamic optical beam control, micro/nano-electro-mechanical systems (MEMS/NEMS) based dynamic optical beam control optics, electrochromic gradient based control, microlens based passive beam control, passive control using segment control (y-y area and pixels), holographic films, switchable diffusers and/or gratings, and lens or microlens arrays based on liquid crystal materials. Of course, these modulation technologies are given by way of non-limiting examples, and other modulation techniques may be used to implement modulator 130. The optical modulator technology, the number of elements/cells/pixels of the optical modulator 130, and/or the arrangement of the optical modulator 130 relative to the optical transducer 110 and/or lens 112 for a given implementation of the device 100 may be chosen so that the modulated light selectively achieves various possible lighting output or input distributions.

In one example, optical modulator 130 utilizes electrowetting to spatially modulate light to or from optical transducer 110. Electrowetting is a fluidic phenomenon that enables changing of the configuration of a contained fluid system in response to an applied voltage. In general, application of an electric field modifies the wetting properties of a surface, typically a hydrophobic surface, in the fluid system. Examples of electrowetting optics use two immiscible fluids having different electrical properties. In at least some examples, the two fluids have different indices of refraction. One fluid may be conductive. The other fluid may be non-conductive. Both the conductive and non-conductive fluids may be adjacent to the hydrophobic surface, with the conductive fluid also in contact with an electrode, which normally is not hydrophobic. The conductive fluid may be a transparent liquid, but the other fluid may be reflective, transparent, or transmissive with a color tint. Where both liquids are transparent or transmissive, the non-conductive fluid may exhibit a higher index of refraction than the conductive fluid. In such a transmissive optic example, changing the applied electric field changes the shape of the fluid interface surface between the two liquids and thus the refraction of the light passing through the interface surface. If the interface surface is reflective (e.g. due to reflectivity of one of the liquids or inclusion of a reflector at the fluid interface), changing the applied electric field changes the shape of the reflective interface surface and thus the steering angle of the light reflected at the interface surface. Depending on the application for the electrowetting optic, the light may enter the fluid system to pass first through either one or the other of the two liquids.

The present optical devices 100 can use a variety of different types of electrowetting optics, for example, including various types of transmissive electrowetting optics and various types of reflective electrowetting optics.

A transmissive electrowetting optic bends or shapes light passing or transmitted through the electrowetting optic. The degree of bending or shaping varies with the angle or shape of the fluid interface surface in response to the applied electric field. Transmissive optics, for example, can take the form of a variable shaped lens, a variable shaped prism, combinations of prism and lens optics, or even a variable shaped grating formed by a wavefront across the interface surface.

By contrast, a reflective electrowetting optic reflects light, and the angular redirection and/or shaping of the reflected light varies with the angle or shape of the fluid interface surface in response to the applied electric field. The two-liquid system may be controlled like a prism, e.g. in front of a mirror surface within the optic. Alternatively, the system may be configured such that the variable shaped surface itself is reflective.

Electrowetting optics are a useful technology for implementing controllable beam steering and/or beam shaping for software configurable optical devices. However, for optical devices, there may be a need for relatively large beam steering angles. In a two-liquid electrowetting optic, the optical path is related to the refractive indices of liquids that are used. Typically oil and saline are used in combination for the electrowetting optic, however, the refractive index of oil limits the maximum deflection angle that can be achieved. In addition, a large beam steering angle requires large contact angle between oil and water, which requires higher operating voltage. Accordingly, the configurable optical devices described herein utilize one or more lenses 150 in combination with an electrowetting modulator in order to increase the maximum steering angle that can be achieved.

For convenience, FIGS. 1A and 1B show an arrangement of the optical transducer 110 and the spatial modulator 130 that corresponds most closely to use of a transmissive type modulator, where the modulator passes light through but modulates distribution of the transmitted light. Similar arrangements are shown for convenience in several of the later drawings, as well. Those skilled in the art will appreciate that other types of transducer/modulator arrangements may be used, for example, in which the modulator reflects light instead of or in addition to transmissive passage of the light being spatially modulated.

One or more lenses 150 are coupled to receive and redirect light to or from optical modulator 130. The positioning of lens or lenses 150 may optionally be determined based on the focal length of the positive lens 112. FIGS. 1A and 1B show two different examples of implementations of the one or more lenses 150. In the example shown in FIG. 1A, a pair of lenses 150A is positioned at a distance from lens 112 that is approximately equal to the focal length of lens 112. In the second example shown in FIG. 1B, a wide angle lens such as a fisheye lens 150B is positioned at a distance from lens 112 that is approximately equal to the focal length of lens 112. Other suitable lens configurations may be used to implement the one or more second lenses 150 in devices similar to 100A, 100B in these first two drawings. Nonetheless, it will be understood that the distance between lens 112 and lenses 150A or 150B can change depending on the output optical performance required by the optical device, and/or on the geometry of lenses 150A or 150B. The direction and extent of the redirection caused by lenses 150 is dependent on the spatial position at which the modulated light contacts lenses 150.

Lenses 150A in FIG. 1A are illustrated as plano-convex. The examples shown in the drawings and described herein, however, are not so limited. Lenses having any curvature, including concave or bio-convex lenses, may be used to steer light to or from modulator 130. In the alternative example shown in FIG. 1B, a single spherical or aspherical fisheye lens may be used as lens 150B. The selection of a geometry for the one or more second lenses 150 may be made based on the desired steering properties for the lens(es). The direction and extent of the redirection caused by lenses 150 may be determined based on the geometry and positioning of lenses 150 relative to optical modulator 130.

FIG. 1C provides an example of a controller 160 that may be used in a configurable optical device. Controller 160 is configured to control the operation of optical transducer 110 and/or spatial modulator 130 to output a selected light output distribution, e.g. for a general illumination application, or to input a selected light detection distribution on optical transducer 110. As a general overview, controller 160 includes a driver system 162, a host processing system 164, one or more communication interface(s) 166, and one or more sensors 168.

The host processing system 164 provides the high level logic or "brain" of the device 100. In the example, the host processing system 164 includes data storage/memories 170, such as a random access memory and/or a read-only memory, as well as programs 172 stored in one or more of the data storage/memories 170. The data storage/memories 170 store various data, including device configuration information 173 or one or more configuration files containing such information, in addition to the illustrated programming 172. The host processing system 164 also includes a central processing unit (CPU), shown by way of example as a microprocessor (μP) 174, although other processor hardware may serve as the CPU.

The ports and/or interfaces 176 couple the processor 174 to various other elements of the device 100, such as the driver system 162, the communication interface(s) 166 and the sensor(s) 168. For example, the processor 174 by accessing programming 172 in the memory 170 controls operation of the driver system 162 and other operations of the optical device 100 via one or more of the ports and/or interfaces 176. In a similar fashion, one or more of the ports 176 enable the processor 174 of the host processing system 168 to use and communicate externally via the interfaces 166; and the one or more of the ports 176 enable the processor 174 of the host processing system 168 to receive data regarding any condition detected by a sensor 168, for further processing.

In the examples, based on its programming 172, the processor 174 processes data retrieved from the memory 170 and/or other data storage, and responds to light output or input parameters in the retrieved data to control optical transducer 110 and optical modulator 130. The light control also may be responsive to sensor data from a sensor 168. The light output or input parameters may include light intensity and light color characteristics in addition to spatial modulation (e.g. steering and/or shaping and the like for achieving a desired output or input spatial distribution).

As noted, the host processing system 164 is coupled to the communication interface(s) 166. In the example, the communication interface(s) 166 offer a user interface function or communication with hardware elements providing a user interface for the device 100. The communication interface(s) 166 may communicate with other control elements, for example, a host computer of a building control and automation system (BCAS). The communication interface(s) 166 may also support device communication with a variety of other systems of other parties, e.g. the device manufacturer for maintenance or an on-line server for downloading of virtual luminaire configuration data.

The host processing system 164 also is coupled to the driver system 162. The driver system 162 is coupled to the optical transducer 110 and the optical modulator 130 to control one or more operational parameter(s) of the light. Such operational parameters may include parameters for light output by a light source-type optical transducer 110, or may include parameters for light input to a light detector-type optical transducer 110. The one or more parameters may also control the modulation of that light by the optical modulator 130. Although the driver system 162 may be a single integral unit or implemented in a variety of different configurations having any number of internal driver units, one example of system 162 includes an optical transducer driver circuit 178 and a spatial modulator driver 180. The drivers 178, 180 are circuits configured to provide signals appropriate to the respective type of optical transducer 110 and/or modulator 130 utilized in the particular implementation of the device 100, albeit in response to commands or control signals or the like from the host processing system 164.

The host processing system 164 and the driver system 162 of controller 160 provide a number of control functions for controlling operation of the optical device 100. In a typical example, execution of the programming 172 by the host processing system 164 and associated control via the driver system 162 configures the optical device 100 to perform functions, including functions to operate a light source-type transducer 110 to provide light output from the optical device, to operate a light detector-type transducer to detect light input to the optical device, and/or to operate the optical modulator 130 to steer and/or shape the light to or from optical transducer 110 and/or redirected by lens 112 so as to create a selected distribution of the light. By changing the distribution of the light on lenses 150, controller 160 may emulate a lighting distribution of a selected one of a number of types of luminaire, based on the optical device configuration information 173. By changing the distribution of the light on a light detector-type optical transducer 110, controller 160 may select a desired light detection distribution.

Apparatuses implementing functions like those of device 100 may take various forms. In some examples, some components attributed to the optical device 100 may be separated from the optical transducer 110 and the optical modulator 130. For example, an apparatus may have all of the above hardware components on a single hardware device as shown or in different somewhat separate units. In a particular example, one set of the hardware components may be separated from the optical transducer 110 and the optical modulator 130, such that the host processing system 164 may run several similar systems of transducers and modulators from a remote location. Also, one set of intelligent components, such as the microprocessor 174, may control/drive some number of driver systems 162 and associated optical transducers 110 and optical modulators 130. It also is envisioned that some optical devices may not include or be coupled to all of the illustrated elements, such as the sensor(s) 168 and the communication interface(s) 117. For convenience, further discussion of the devices 100 of FIGS. 1A, 1B, and 1C will assume an intelligent implementation of the device that includes at least the illustrated components.

In addition, the device 100 is not size restricted. For example, each device 100 may be of a standard size, e.g., 2-feet by 2-feet (2×2), 2-feet by 4-feet (2×4), or the like, and arranged like tiles for larger area coverage. Alternatively, the device 100 may be a larger area device that covers a wall, a part of a wall, part of a ceiling, an entire ceiling, or some combination of portions or all of a ceiling and wall.

In an operation example, the processor 174 receives a light output configuration file 173 via one or more of communication interfaces 166. The configuration file 173 indicates a user selection of a virtual luminaire light distribution to be output by the configurable optical device 100. The processor 174 may store the received configuration file 173 in storage/memories 170. Each configuration file includes software control data to set the light output parameters of the software configurable optical device 100 at least with respect to optical spatial modulation. The configuration information in the file 173 may also specify operational parameters of the light source-type transducer 110, e.g. illumination related parameters such as light intensity, light color characteristic and the like. The processor 174 by accessing programming 172 and using software configuration information 173, from the storage/memories 170, controls operation of the driver system 162, and through that system 162 controls the light source-type transducer 110 and the optical modulator 130. For example, the processor 174 obtains spatial distribution control data from a configuration file 173, and uses that data to control the modulation driver 180 to cause modulator 130 to optically spatially modulate output of the light source-type transducer 110 to direct the light to a selected region of lenses 150, in order to cause lenses 150 to redirect the modulated light and produce a selected light distribution. In this way, the configurable optical device 100 achieves a user selected light distribution for a general illumination application of a luminaire, e.g. selected from among any number of luminaire emulations within the operational capabilities of the optical device 100.

In another operation example, the processor 174 receives a light input configuration file 173 via one or more of communication interfaces 166. The configuration file 173 indicates a user selection of a light detection distribution to be obtain by the configurable optical device 100. The processor 174 may store the received configuration file 173 in storage/memories 170. Each configuration file includes software control data to set the light input parameters of the software configurable optical device 100 at least with respect to optical spatial modulation. The configuration information in the file 173 may also specify operational parameters of the light detector-type transducer 110, e.g. parameters such as exposure time, shutter speed, etc. The processor 174 by accessing programming 172 and using software configuration information 173, from the storage/memories 170, controls operation of the driver system 162, and through that system 162 controls the light detector-type transducer 110 and the optical modulator 130. For example, the processor 174 obtains spatial distribution control data from a configuration file 173, and uses that data to control the modulation driver 180 to cause modulator 130 to optically spatially modulate input light onto the light detector-type transducer 110 to direct the light to a selected region of the light detector. In this way, the configurable optical device 100 achieves a user selected light detection distribution.

FIG. 2 illustrates an example in which a LED type light engine 210, serving as the light source, a spatial modulator 230, and lenses 250 are used in a luminaire or other type of configurable lighting device. It will be understood that the general features and configurations of the light engine 210 described below may alternatively applied to a light sensor.

Depending on the configuration of the LED based light engine 210 and the spatial modulator 230, the light output from engine 210 may be supplied directly to an optical input of the spatial modulator 230. As an option, however, the device/system of FIG. 2 may further include a light coupling element 214 to enhance the coupling of the light output from the LED based light engine 210 to the optical input of the spatial modulator 230. Examples of such a coupling element 214 include one or more lenses (such as lens 112 in FIGS. 1A and 1B) and/or one or more substrates (such as substrate 114 in FIGS. 1A and 1B).

For general lighting applications, many manufacturers have developed LED sub-assemblies referred to as "LED light engines" that are readily adaptable to use in various luminaires. The light engine typically includes some number of LEDs that together produce a specified lumen output of a specified color characteristic or controllable range thereof, e.g. white light of a particular value or range for CRI or R9. The light engine also includes the supporting circuit board, heat sink and any additional housing for the LEDs. The light engine may also include a diffuser and/or the driver circuitry appropriate to provide drive current to the LEDs of the light engine. Any of a wide range of LED light engine designs may be used in an implementation of a software configurable lighting device. In such an example, a LED based light engine 210 produces light output, which is coupled to the spatial modulator 230.

In this example, one such spatial modulator 230 modulates the entire cross-section of the output of the light from the LED light engine 210. In such an implementation, the spatial modulator 230 may be a single controllable device extending across the output aperture of the LED based light engine 210, in which case drive of the one modulator 230 causes the modulator 230 to implement an integral controllable steering or shaping of the entire output of the LED based light engine 210.

Alternatively, the spatial modulator 230 may be subdivided into pixels, e.g. in a matrix array arrangement extending across the output aperture of the LED based light engine 210, in which case different individual or sub-modulators at the pixels of the array spatially modulate different portions of the light output from the LED based light engine 210. If the associated driver (e.g. 180 in FIG. 1C) individually controls the pixels of such a spatial modulator 230 different beam outputs from the LED based light engine 210 can be independently shaped or steered. Each pixel may include its own lens or lenses 250 for further redirecting light from modulator 230. As used herein, pixels refer to individually controllable units or cells in a matrix or array, for example, together forming the optical spatial modulator 230, as opposed to individual points in a picture or other type of image. In this example, the modulated light output of the overall device, from the output of pixel array implementation of the spatial modulator 230 and lenses 250, provides the selected illumination light distribution, for a general lighting application. The spatial modulator 230 may use any of the modulation technologies outlined earlier, either to implement a single modulator device across the aperture or to implement any or all of the pixels of an array of modulator cells.

As discussed above relative to FIG. 1C, the distributed output of the device/system of FIG. 2, from the modulator 230, provides a light distribution on lenses 250 that results in the emulation of a distribution of a luminaire for a general lighting application. Since the modulator 230 is controllable, e.g. by a host processing system or other type of controller, the distribution may be selected to emulate any desired luminaire distribution within the range of capabilities of the particular modulator design used for element 230 of the device. The redirection of light from each pixel using lenses 250 is dependent on the arrangement of the lenses.

Figure 3:
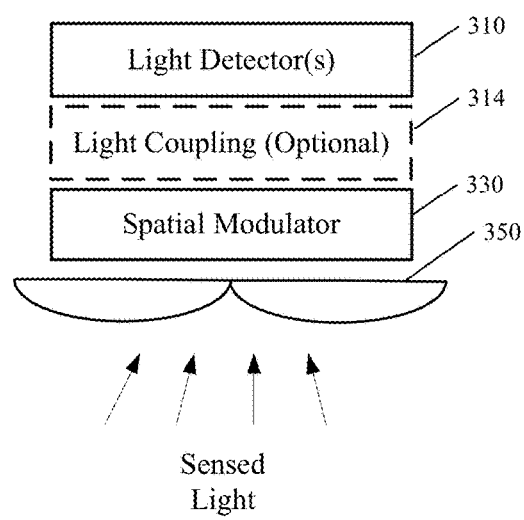
FIG. 3 is a high-level functional block diagram of an example of the light detector and spatial modulator of a configurable lighting sensor.

FIG. 3 illustrates an example in which one or more light detector(s) 310, a spatial modulator 330, and lenses 350 are used in a configurable light sensor. Depending on the configuration of the light detector(s) 310 and the spatial modulator 330, the light from modulator 330 may be supplied directly to an optical input of the light detector(s) 310. As an option, however, the device/system of FIG. 3 may further include a light coupling element 314 to enhance the coupling of the light input from modulator 330 to the optical input of the light detector(s) 310. Examples of such a coupling element 314 include one or more lenses (such as lens 112 in FIGS. 1A and 1B) and/or one or more substrates (such as substrate 114 in FIGS. 1A and 1B).

The light detector 310 may be a single photodetector, such as a photodiode or some number of detectors arranged to work together to process light received through the spatial modulator 330. For general light sensing applications, for example, many manufacturers have developed arrays of light detectors that are readily adaptable to use in various image sensors. Such arrays include conventional charged-coupled device (CCD) pixel arrays or conventional complementary metal-oxide-semiconductor (CMOS) pixel arrays. They may include a supporting circuit board, optical elements, and or associated housing of the pixel arrays. They may also include driver circuitry appropriate to drive the pixels to detect the light in predetermined patterns, such as at a particular shutter speed. Any of a wide range of photodetectors may be used in an implementation of a configurable light sensing device.

In this example, spatial modulator 330 modulates the entire cross-section of the input of the light to light detector(s) 310. In such an implementation, the spatial modulator 330 may be a single controllable device extending across the input aperture of the light detector(s) 310, in which case drive of the one modulator 330 causes the modulator 330 to implement an integral controllable steering or shaping of the entire input of the light sensor.

Alternatively, for use with arrays of light detectors, the spatial modulator 330 may be subdivided into pixels, e.g. in a matrix array arrangement extending across the input aperture of array of light detectors 310, in which case different individual or sub-modulators at the pixels of the array spatially modulate different portions of the light input. The pixel dimensions of an array of beam steering and/or shaping devices used to implement the modulator 330, however, need not be the same as the pixel dimensions of the array of detectors 310. For example, one pixel of an array implementation of the modulator 330 may controllable shape and/or steer light to one pixel, two pixels or some larger number of (but not all of) the pixels of the array of detectors at 310. If the associated driver (e.g. 180 in FIG. 1C) individually controls the pixels of such a spatial modulator 330 different beam inputs to the array of light detectors can be independently shaped or steered. Each pixel of the array of modulators 330 may include its own lens or lenses 350 for further redirecting light onto modulator 330. The spatial modulator 330 may use any of the modulation technologies outlined earlier, either to implement a single modulator device across the aperture or to implement any or all of the pixels of an array of light detectors.

FIGS. 4A-4E show different layouts of lenses, or multi-lens arrangements, for achieving selected light output or input distributions with the light from the optical modulator. These lens arrangements may be provided on a pixel by pixel basis as described above, resulting in an array of lenses.

Figure 4B:
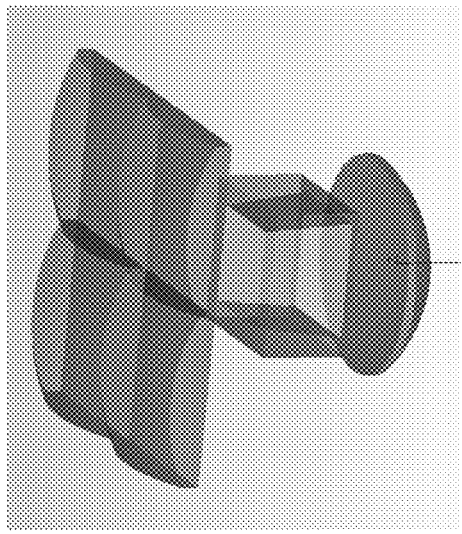
FIGS. 4A-4E are diagrams of different layouts for lenses of a configurable optical device, system, or apparatus.
Figure 4D:
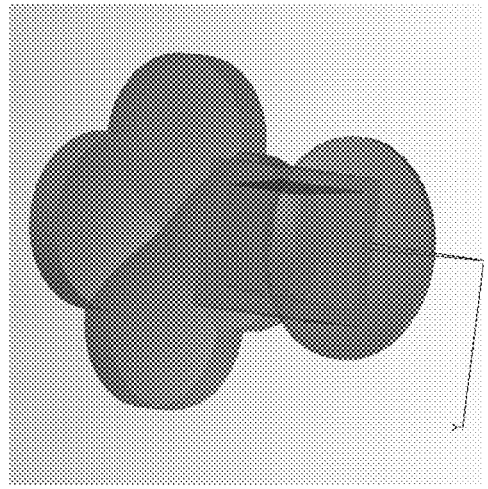
Figure 4A:
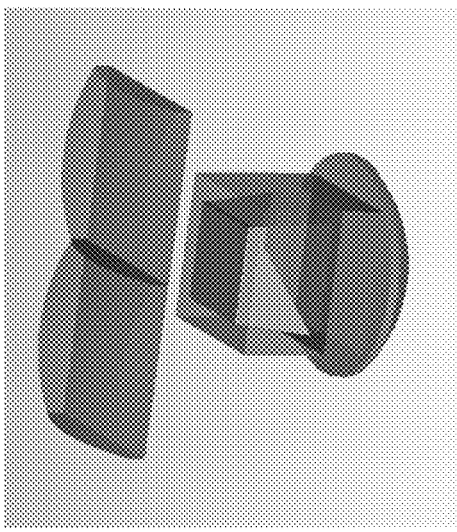

FIG. 4A shows a pair of lenses. The use of a pair of lenses allows for one-dimensional steering of light to or from the optical transducer, along the direction in which the pair of lenses are aligned. The common edge of the lenses (i.e., the line along which they contact one another) intersects the optical axis of the optical modulator, such that the pair of lenses are "centered" above the modulator. This orientation may provide the largest area onto which the optical modulator can distribute the light.

Figure 4C:
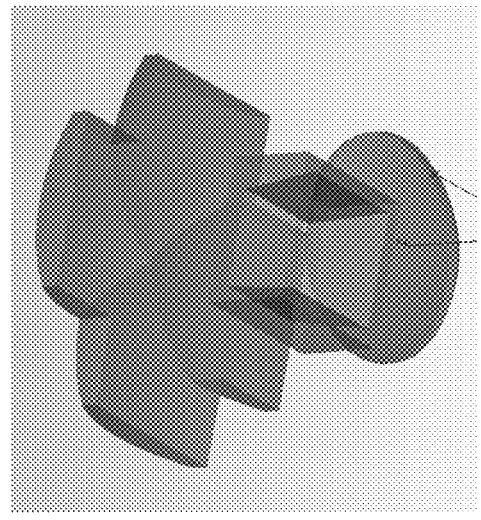

FIGS. 4B, 4C, and 4D show four lenses, generally arranged in a 2×2 array. The use of a 2×2 array of lenses allows for two-dimensional steering of light to or from the optical transducer. The center of each 2×2 array of lenses falls on the optical axis of the optical modulator, such that the array of lenses is "centered" above the modulator. This orientation may provide the largest area onto which the optical modulator can distribute the light. While a 2×2 array of lenses is shown in these figures, it will be understood that any N×M array of lenses may be used, where N and M are integers greater than or equal to 2.

Figure 4E:
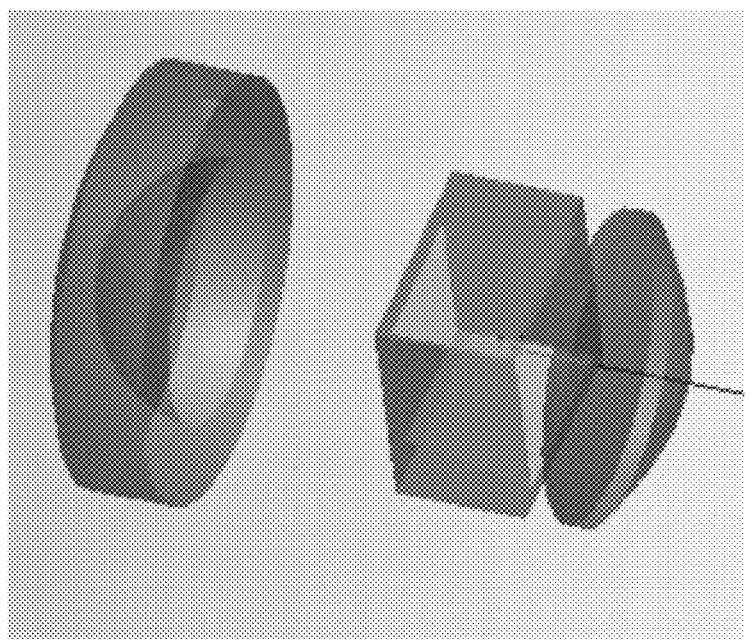

FIG. 4E shows a single spherical or aspherical fisheye lens, similar to the lens 150B in FIG. 1B discussed above. The use of a fisheye lens allows for a wide range of two-dimensional steering or light without the associated problems of interference caused by some multi-lens arrangements. The center of the fisheye lens falls on the optical axis of the optical modulator, such that the fisheye lens is "centered" above the modulator.

While the lenses in these diagrams are shown sharing a common edge, this illustration is not intended to be limiting. The lenses may alternatively be spaced from one another. The lenses may also be stacked one on top of the other, such that the light passes through multiple lenses. Other orientations of lenses besides those shown will be apparent to one of ordinary skill in the art from the description herein. Likewise, the lenses are not limited to the shapes illustrated in FIGS. 4A-4D, but may have any shape such as circular, elliptical, rectangular, square, etc.

As set forth above, the optical devices described may use different types of electrowetting optics as the controllable optical modulator 130. Examples of electrowetting optics are illustrated in FIGS. 5A and 5B, and are described below.

Figure 5B:
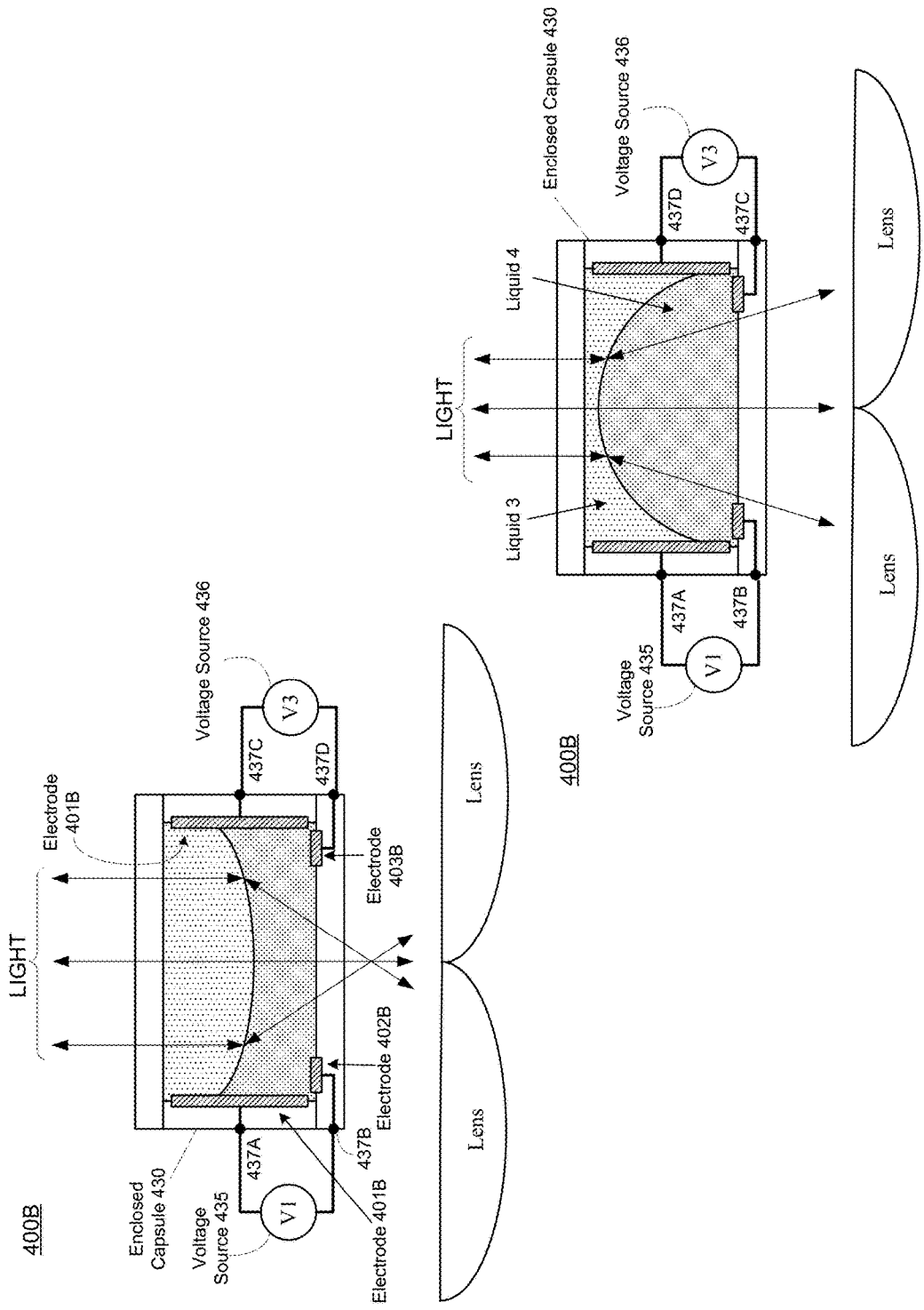

As shown in FIGS. 5A and 5B, an optical modulator is controllable in response to control voltages to spatially modulate light to or from the optical transducer. For example, the spatial modulator 400A may process input light by deflecting (i.e., refracting) the inputted light, while the spatial modulator 400B processes input light by shaping the beam of light. In other words, each spatial modulator 400A or 400B may act as a lens that processes input light according to control signals.

FIG. 5A illustrates an electrically controllable liquid prism lens within enclosed capsule 410. The ray tracings are provided to generally illustrate the beam steering and beam shaping concepts and are not intended to indicate actual performance of the illustrated electrically controllable liquid prism lens. The enclosed capsule 410 is configured with one or more immiscible liquids (e.g., Liquid 1 and Liquid 2) that are responsive to an applied voltage from voltage source 415. For example, the liquids 1 and 2 may an oil and water, respectively, or some other combination of immiscible liquids that are electrically controllable. The desired spatial distribution effects are provided based on liquid 1 having a higher index of refraction than the index of refraction of liquid 2. The enclosed capsule 410, which has a physical shape of a cube or rectangular box, retains the liquids 1 and 2 to provide an electrically controllable liquid prism lens. The enclosed capsule 410 includes terminals 417A, 417B, 419A and 419B that are coupled to electrodes 401A, 402A, 403A and 404A, respectively.

As shown in the example of FIG. 5A, the modulator 400A has a first state in which the voltage source 415 outputs a voltage V1 that is applied across terminals 419A and 419B and the voltage source 426 outputs a voltage V2 that is applied across terminals 417A and 417B. The voltage V1 applied to electrodes 401A and 402A and voltage V2 applied to electrodes 403A and 404A causes the liquids 1 and 2 to assume the first state shown on the left side of FIG. 5A. As shown, the input light is deflected toward the right side of the second lenses in the first state. On the bottom right side of FIG. 5A, an example illustrates the output light deflection when modulator 400A is in a second state. The modulator 400A achieves the second state when the combination of voltages V1 and V2 is applied by voltage sources 415 and 416. The modulator 400A in the second state deflects the light in a direction opposite that of when the modulator is in the first state. Modulator 400A may achieve other states based on the input voltage, such as a state in which voltage is applied to the two liquids to achieve a certain meniscus (e.g. a meniscus that makes the electrowetting optics work as a plano lens), so that the light passes directly through the spatial modulator 400A substantially without deflection. Examples of other states resulting from different applied voltages include states achieving somewhat greater deflection than the state of FIG. 5A (further to the right in that illustration), somewhat greater deflection than the state of FIG. 5B (further to the left in that illustration), or deflections in the range between the two illustrated states. Hence, the angle of the deflection may be manipulated by adjusting the voltages applied by voltage sources 415 and 416. The voltages V1 and V2 may or may not be equal; they may be applied simultaneously at different values to achieve a particular state between the first and second states. Although the voltages V1 and V2 are described as being applied simultaneously, the voltage V1 and V2 may be applied separately.

The spatial modulator 400B of FIG. 5B illustrates an electrically controllable lens having a beam shaping capability. The ray tracings are provided to generally illustrate the beam steering and beam shaping concepts and are not intended to indicate actual performance of the illustrated electrically controllable liquid prism lens. The modulator 400B, like modulator 400A, is configured with one or more immiscible liquids (e.g., Liquid 3 and Liquid 4) that are responsive to an applied voltage from voltage sources 415 and 416. For example, the liquids 3 and 4 may an oil and water, respectively, or some other combination of immiscible liquids that are electrically controllable. The desired spatial distribution effects are provided based on liquid 3 having a higher index of refraction than the index of refraction of liquid 4. In the illustrated example, the liquid 3 has a higher index of refraction than liquid 4. Although the enclosed capsule 430 is shown as a rectangular box, the enclosed capsule 430 may have the physical shape of a cube, a cylinder, ovoid or the like. The enclosed capsule 430 retains liquids 3 and 4, and is also configured with electrodes 401B and 402B that surround the periphery of the enclosed capsule 430. By surrounding the periphery of the enclosed capsule 430, voltages applied to the electrodes 401B-404B cause the liquids 3 and 4 to form a lens that provides beam shaping processing of the input light. Terminals 437A and 437B allow voltage source 435 to be connected to the modulator 400B. As shown on the top left side of FIG. 5B, the voltage source 435 applies a voltage V1 across the terminals 437A and 437B. In response to the applied voltages V1 and V3 the liquids 3 and 4 react to provide a concave shaped lens as in the first state. Input light from a light source (not shown) is processed based on control signals indicating the voltage to be applied by the voltage sources 435 and 436 to provide a shaped beam that focuses the light at a point the locus of which is electrically controllable.

The modulator 400B is further configurable to provide beam dispersion. As shown in the bottom right side of FIG. 5B, the modulator 400B based on applied voltages V1 and V3 forms a convex lens, shown as the second state, that disperses the input light. In particular, the voltage source 435 applies voltage V1 across terminals 437A and 437B, which is then applied to electrodes 401B and 402B. Similarly, the voltage source 436 applies a voltage V3 that is applied across terminals 437C and 437D that is provided to electrodes 403B and 4044B. The voltage V1 applied to electrodes 401B and 402B and the voltage V3 applied to electrodes 403B and 404B causes the liquids 3 and 4 to react to assume the second state shown on the lower right in FIG. 5B. Depending upon the voltages applied by voltage sources 435 and 436 to the respective electrodes, other states between those shown may also be attained.

The beam steering functions of FIG. 5A and the beam shaping functions of FIG. 5B are described separately for ease of explanation; however, the functions and capabilities described and illustrated with reference to FIGS. 5A and 5B may be combined in a single electrowetting optic to provide a combined electrowetting optic that is capable of simultaneously beam steering and beam shaping, separately providing beam steering or separately providing beam shaping. By applying different voltages to the respective electrodes, the simultaneous electrically controllable beam steering and beam shaping may be provided.

Figure 6:
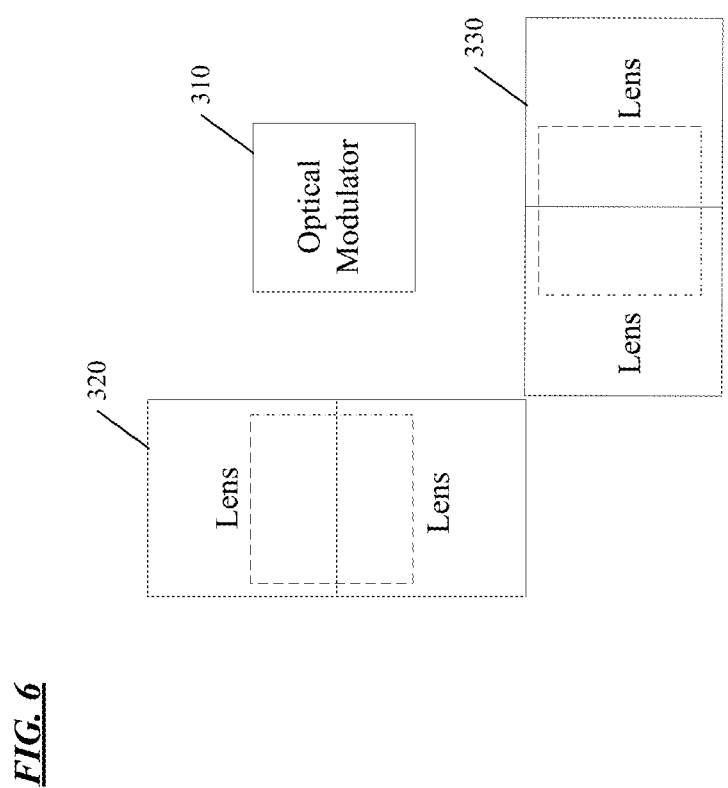
FIG. 6 is a block diagram of a number of components as may form one configurable optical device or a pixel of an array of configurable optical devices.

As set forth above, the use of a pair of lenses allows for one-dimensional steering of light to or from the optical transducer. In order to enable steering in two dimensions in an array of pixels (such as described above in FIG. 1C), adjacent or nearby pixels may be provided with orthogonal pairs of lenses. FIG. 6 shows a top view of an array of three pixels 310, 320, 330 of a configurable optical device. The first pixel 310 includes an optical modulator, but no lens positioned above. As a result, the light to or from this pixel 310 can be steered only to the extent provided by the optical modulator. In an example in which pixel 310 includes an electrowetting lens as the optical modulator, the light to or from pixel 310 may be steered up to 9 degrees from the optical center of the pixel 310. The second pixel 320 includes an optical modulator (shown in dashed lines) and a pair of lenses oriented along the vertical direction. The light to or from this pixel 320 can be steered to a greater degree in the vertical direction, for example, up to 24 degrees from the optical center of pixel 320. The third pixel 330 includes an optical modulator (shown in dashed lines) and a pair of lenses oriented along the horizontal direction. The light to or from this pixel 330 can be steered to a greater degree in the horizontal direction, for example, up to 24 degrees from the optical center of pixel 330. While pixels 320 and 330 are shown with their optical centers aligned orthogonally, it will be understood that any alignment or angle between the optical centers of each pair of lenses may be selected based on the distribution of light provided to or from the optical modulator or the lighting distribution to be emulated.

Each pixel 310, 320, 330 may include the optical and control components of optical devices 100 illustrated in FIGS. 1A, 1B, and 1C. Additionally, pixels 310, 320, 33 may be individually controlled according to the description above. Thus, depending on the type of beam steering or shaping required to produce the selected lighting input or output distribution, one or more of pixels 310, 320, 330 could be controlled to produce light, to steer the light, detect light, or to not produce light at all.

FIGS. 7A-7G are graphs of light output spatial distribution for different examples of lens layouts for a configurable lighting device. These graphs illustrate the potential of various lens layouts for steering the light output from a light source-type optical transducer away from the optical axis of the optical modulator. It will be understood by one of ordinary skill in the art that similar light input spatial distributions may be achievable for use with light detector-type optical transducers.

Figure 7B:
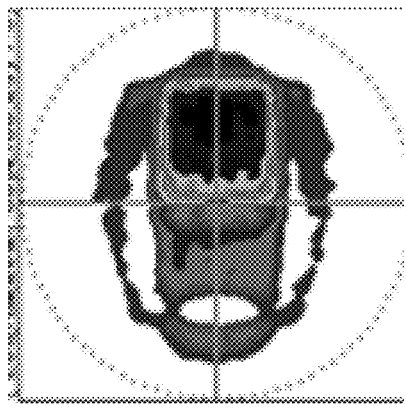
FIGS. 7A-7G are graphs of light output spatial distribution for different examples of lens layouts for a configurable optical device.
Figure 7D:
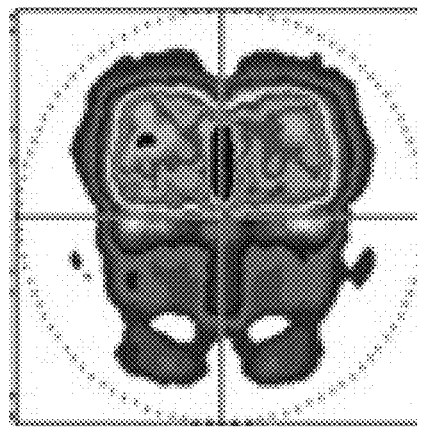
Figure 7A:
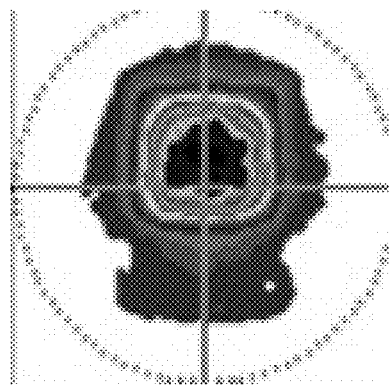
Figure 7C:
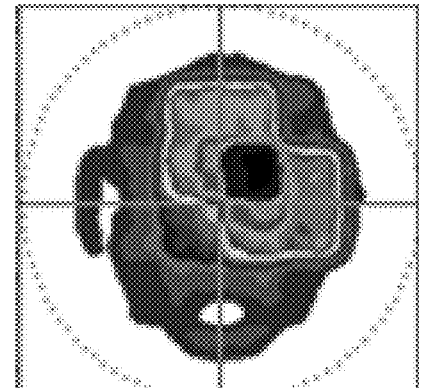
Figure 7F:
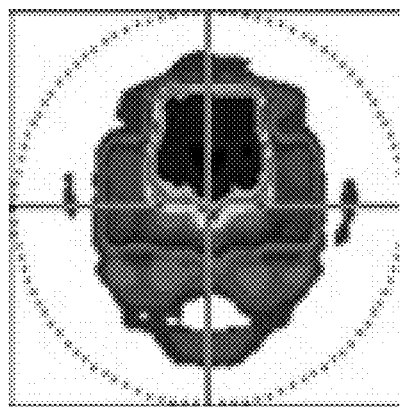
Figure 7E:
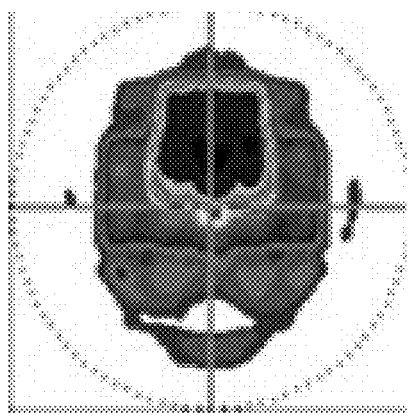
Figure 7G:
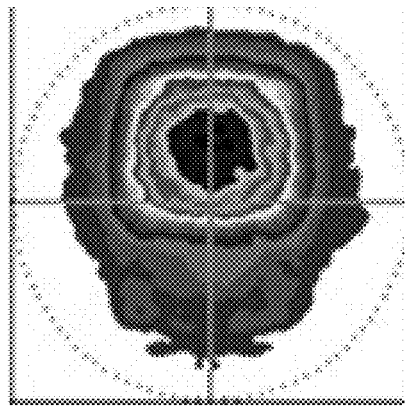

FIG. 7A illustrates the spatial distribution of light for an electrowetting optical modulator without a lens. The maximum light beam steering enabled by this layout is 9°. FIG. 7B illustrates the spatial distribution of light for an optical modulator having a pair of lenses oriented as shown in FIG. 4A. The maximum light beam steering enabled by this layout is 24° in the direction with which the optical centers of the lenses are aligned. FIG. 7C illustrates the spatial distribution of light for two optical modulators having a pair of orthogonally aligned lens, as shown in FIG. 6. The maximum light beam steering enabled by this layout is 24° in both directions of the lenses, e.g., the x and y directions. FIG. 7D illustrates the spatial distribution of light for an optical modulator having an array of lenses arranged as shown in FIG. 4B; FIG. 7E illustrates the spatial distribution of light for an optical modulator having an array of lenses arranged as shown in FIG. 4C; FIG. 7F illustrates the spatial distribution of light for an optical modulator having an array of lenses arranged as shown in FIG. 4D. The maximum light beam steering enabled by each of these layouts is 20° in both the x and y directions. FIG. 7G illustrates the spatial distribution of light for an optical modulator having a single spherical fisheye lens as shown in FIG. 4E. The maximum light beam steering enabled by this layout is 18° in any direction. It should be understood that the "maximum" light been steering angles set forth above apply to the specific examples shown in the accompanying figures, and are not limiting. Alternative systems may be optimized according to the description herein to achieve even larger steering angles in certain examples.

Figure 8B:
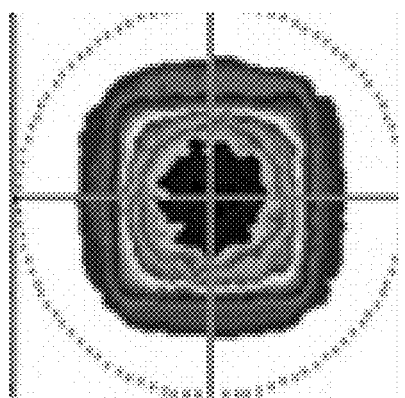
FIGS. 8A-8J are graphs of light output spatial distribution for different examples of lens layouts for a configurable optical device.
Figure 8D:
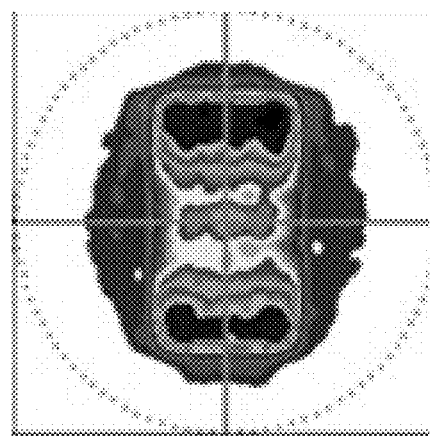
Figure 8A:
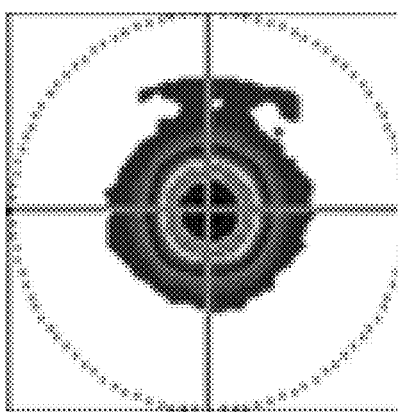
Figure 8C:
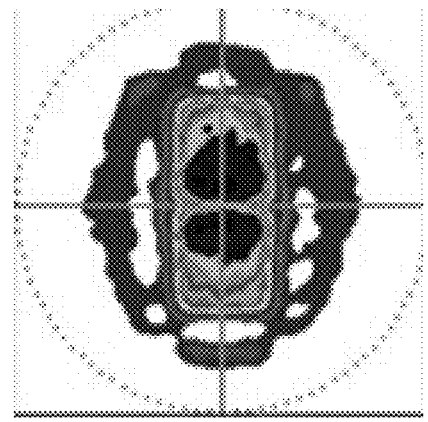
Figure 8F:
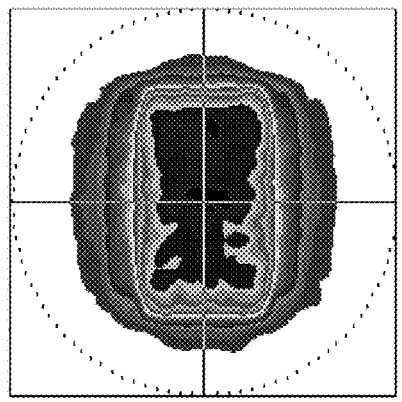
Figure 8H:
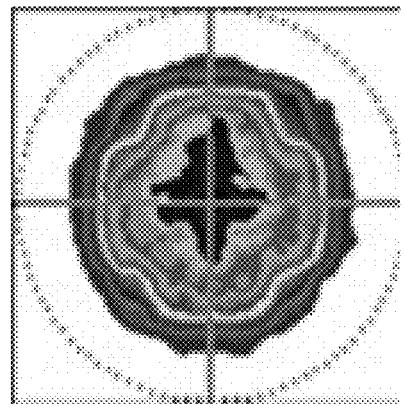
Figure 8E:
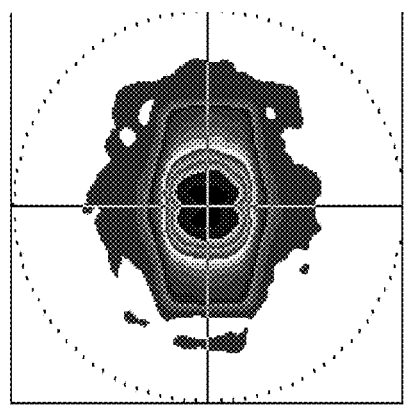
Figure 8G:
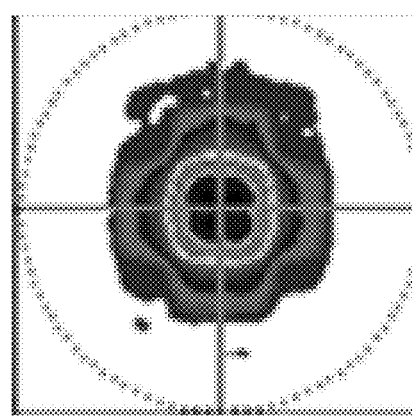
Figure 8J:
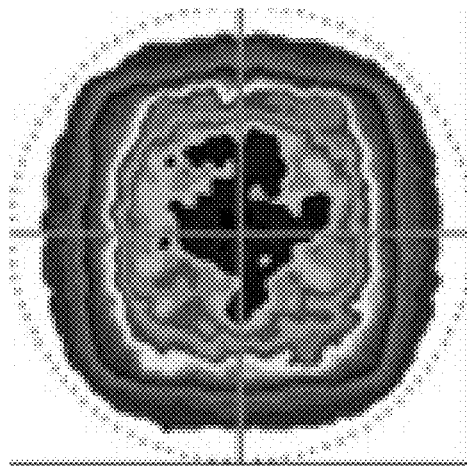
Figure 8I:
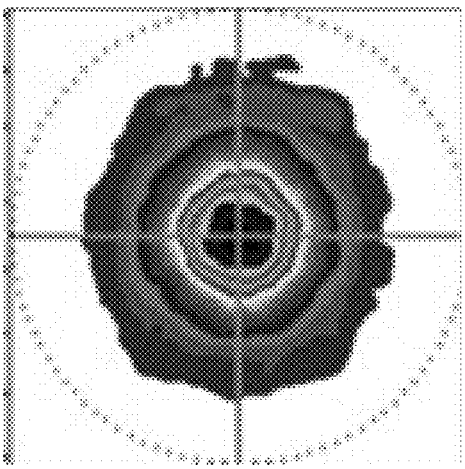

FIGS. 8A-8J are also graphs of light output spatial distribution for different examples of lens layouts for a configurable lighting device. These graphs illustrate the potential of various lens layouts for shaping the light output from the light source, e.g., to have a narrow or wide beam width. FIGS. 8A and 8B illustrate the spatial distribution of light for an electrowetting optical modulator without a lens. FIGS. 8C and 8D illustrate the spatial distribution of light for an optical modulator having a pair of lenses oriented as shown in FIG. 4A. The range of beam shaping enabled by this layout extends from 26° to 50°. As shown in these graphs, the peak intensity of the resulting beam is not at the beam's center. To address this, the paired lens layout of FIGS. 8C and 8D may be combined with the lens-free layout of FIGS. 8A and 8B. FIGS. 8E and 8F illustrate the spatial distribution of light for such a combination. The range of beam shaping enabled by this layout extends from 33° to 70° in the horizontal direction. FIGS. 8G and 8H illustrate the spatial distribution of light for an optical modulator having an array of lenses arranged as shown in FIG. 4D. The range of beam shaping enabled by this layout extends from 30° to 70° in the horizontal and vertical directions, and from 32° to 60° at the corners between the horizontal and vertical directions. FIGS. 8I and 8J illustrate the spatial distribution of light for an optical modulator having a single fisheye lens as shown in FIG. 4E. The range of beam shaping enabled by this layout extends from 32° to 70° in the horizontal and vertical directions, and from 30° to 80° at the corners between the horizontal and vertical directions. While this steering exhibits some asymmetry, it will be understood that the symmetry of the beam shaping angles may be improved, e.g., by using a round optical modulator and/or more electrodes to control the modulation of the light.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An optical device comprising:
   an optical transducer configured to convert light to electrical signals or to convert electrical signals to light;
   a multi-lens arrangement positioned to redirect at least some of the light to or from the optical transducer, the multi-lens arrangement being selected from a group consisting of (i) solely a pair of lenses positioned side-by-side and (ii) solely a 2×2 array of lenses in side-by-side contact with one another; and
   a controllable optical modulator between the multi-lens arrangement and the optical transducer, the controllable optical modulator being coupled to receive and spatially modulate the light to or from the optical transducer,
   wherein the optical modulator is selectively controllable to steer and/or shape the light to a selected distribution of light from the multi-lens arrangement onto the optical transducer and/or from the optical transducer onto the multi-lens arrangement.

2. The device of claim 1, wherein the controllable optical modulator comprises an electrowetting optic.

3. The device of claim 1, wherein the multi-lens arrangement consists solely of the pair of lenses positioned side-by-side.

4. The device of claim 1, wherein the multi-lens arrangement consists solely of the 2×2 array of lenses in side-by-side contact with one another.

5. The device of claim 4, wherein the 2×2 array of lenses has a center positioned coaxially with a center of the optical modulator.

6. The device of claim 1, further comprising:
   a controller coupled to control the optical modulator to steer and/or shape the light.

7. The device of claim 1, wherein the optical transducer is a light source configured to emit light.

8. The device of claim 7, wherein the light source is a component of a luminaire.

9. The device of claim 1, wherein the optical transducer is a light detector.

10. The device of claim 9, wherein the light detector is a photodiode.

11. The device of claim 9, wherein the light detector is a photovoltaic device.

12. An optical sensor device comprising:
    a light detector;
    a multi-lens arrangement positioned to receive light and redirect at least some of the light to the detector, the multi-lens arrangement being selected from a group consisting of (i) solely a pair of lenses positioned side-by-side and (ii) solely a 2×2 array of lenses in side-by-side contact with one another;
    a second lens coupled to receive and redirect light from the multi-lens arrangement to the light detector;
    a controllable optical modulator between the multi-lens arrangement and the second lens, the controllable optical modulator being coupled to receive and spatially modulate light redirected by the multi-lens arrangement,
    wherein the multi-lens arrangement is coupled to receive and redirect light toward the controllable optical modulator, and
    wherein the optical modulator is selectively controllable to steer and/or shape the light from the multi-lens arrangement onto the second lens.

13. The device of claim 12, further comprising a transparent substrate filling a space between the second lens and the controllable optical modulator.

14. The device of claim 12, wherein the controllable optical modulator comprises an electrowetting optic.

15. The device of claim 12, wherein the multi-lens arrangement consists solely of the pair of lenses positioned side-by-side.

16. The device of claim 12, wherein the multi-lens arrangement consists solely of the 2×2 array of lenses in side-by-side contact with one another.

17. The device of claim 12, further comprising a controller coupled to control the controllable optical modulator to steer and/or shape light to a selected distribution of the light on the light detector.

18. The device of claim 12, wherein the light detector is a photodiode.

19. The device of claim 12, wherein the light detector is a photovoltaic device.

20. An optical element comprising:
    a first lens;
    a multi-lens arrangement selected from a group consisting of (i) solely a pair of lenses positioned side-by-side and (ii) solely a 2×2 array of lenses in side-by-side contact with one another; and
    a controllable optical modulator between the first lens and the multi-lens arrangement and coupled to receive and spatially modulate light travelling to or from the first lens,
    wherein the optical modulator is selectively controllable to steer and/or shape the light to a selected distribution of light from the multi-lens arrangement onto the first lens onto the multi-lens arrangement.

21. The element of claim 20, wherein the first lens is a positive lens.

22. The element of claim 21, wherein the first lens has a focal length, and the multi-lens arrangement is positioned at a distance from the first lens equal to the focal length of the first lens.

23. The element of claim 20, further comprising a transparent substrate filling a space between the first lens and the controllable optical modulator.

24. The element of claim 20, wherein the multi-lens arrangement consists solely of the pair of lenses positioned side-by-side.

25. The element of claim 20, wherein the multi-lens arrangement consists solely of the 2×2 array of lenses in side-by-side contact with one another.

26. The element of claim 25, wherein the 2×2 array of lenses has a center positioned coaxially with a center of the optical modulator.

27. The device of claim 1, wherein the controllable optical modulator is selectively controllable to change a direction of propagation of at least a portion of the light to create the selected distribution of light.

* * * * *